United States Patent Office 3,733,357
Patented May 15, 1973

3,733,357
PERFLUOROMALONYL FLUORIDES
David Charles England, Wilmington, Del., assignor to E. I. du Pont de Nemours and Company, Wilmington, Del.
No Drawing. Filed Feb. 18, 1972, Ser. No. 227,614
Int. Cl. C07c 55/08
U.S. Cl. 260—544 F          7 Claims

ABSTRACT OF THE DISCLOSURE

Disclosed herein are compounds of the formula

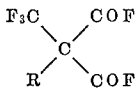

wherein R is F or CF$_3$; and a process therefor comprising reacting carbonyl fluoride with a perfluoro compound selected from perfluoroacrylyl fluoride, perfluoromethacrylyl fluoride and perfluorodimethylketene, in the presence of an alkali metal fluoride catalyst; and their use as waterproofing agents.

SUMMARY AND DETAILS OF THE INVENTION

This invention concerns novel perfluoromalonyl fluorides of the formula

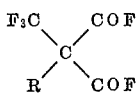

wherein R is F or CF$_3$.

The novel compounds are prepared by the fluoride-catalyzed addition reaction of carbonyl fluoride with a perfluoro reactant selected from the group consisting of perfluoroacrylyl fluoride, perfluoromethacrylyl fluoride and perfluorodimethylketene. The alkali metal fluorides are operable catalysts when used in catalytic amounts such as will be evident to those skilled in the art. Operable reaction temperatures vary between about 50° to 250° C., with a preferred temperature range being 85° C. to 100° C., with 100° C. being the most preferred temperature.

The compounds of this invention are useful as water-repellent and waterproofing agents on paper, cotton and other cellulosic substances.

Utility was demonstrated by subjecting dry samples of both paper and cotton to each of the novel perfluoromalonyl fluorides at about one-third atmosphere pressure and at room temperature for an hour. After evacuation to remove excess perfluoromalonyl fluoride gas, the coated paper and cotton samples were brought to atmospheric pressure and a drop of water was placed on each surface. The water was not absorbed but remained on the surfaces until eventual evaporation. Each of the novel perfluoromalonyl fluorides imparted the same effective waterproofing properties to the paper and the cotton. In contrast, water placed on control samples of paper and cotton (not treated with either of the novel compounds) was rapidly absorbed.

DESCRIPTION OF THE PREFERRED EMBODIMENTS

The following examples illustrate the disclosed process for making the novel compounds of this invention.

EXAMPLE 1

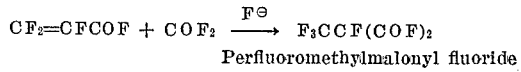
Perfluoromethylmalonyl fluoride

Mixtures of 1 g. of potassium fluoride, 10 ml. of acetonitrile, 17 g. of perfluoroacrylyl fluoride, and 12.5 g. of carbonyl fluoride were sealed in four Carius tubes and heated for 8 hours at 100° C. There was obtained from the four tubes 69 g. (67%) of perfluoromethylmalonyl fluoride, boiling at 17° C.

IR: 5.30μ (COF). $^{19}$F nmr: +28.6 p.p.m. (doublet, J=24 Hz. to quartets, J=7.7 Hz., 2F), −77.9 p.p.m. (overlapping doublet, J=8.4 Hz. to triplets, J=7.7 Hz., 3F), and −175 p.p.m. (triplet, J=24 Hz. of quartets, J=8.4 Hz., 1F).

*Analysis.*—Calcd. for C$_4$F$_6$O (percent): F, 58.76. Found (percent): F, 58.54.

EXAMPLE 2

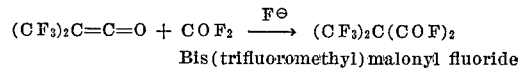
Bis(trifluoromethyl)malonyl fluoride

A Carius tube was charged in the following order with 0.2 g. of cesium fluoride, 2 ml. of tetraglyme, 18 g. of carbonyl fluoride, and 35.5 g. of bis(trifluoromethyl) ketene. The tube was sealed and heated overnight in a steam bath. From this and a similar tube (using 30 g. of ketene and 19 g. of COF$_2$), there was recovered 70.5 g. (78.5%) of bis(trifluoromethyl)malonyl fluoride, B.P. 33° C. which was 89% pure by GLPC. A sample purified by GLPC melted at 5–6° C.

IR: 5.31μ (COF). $^{19}$F nmr: +41.0 p.p.m. (septet, J=9.7 Hz., 2F, −67.2 p.p.m. triplet, J=9.7 Hz., 6F).

*Analysis.*—Calcd. for C$_5$F$_8$O$_2$ (percent): F, 62.29. Found (percent): F, 62.84.

EXAMPLE 3

A mixture of 0.5 g. of cesium fluoride, 2 ml. of tetraglyme, 21 g. of perfluoromethacrylyl fluoride, and 17.5 g. of carbonyl fluoride was sealed in a Carius tube and heated overnight in a steam bath. There was recovered 13.5 g. (47%) of bis(trifluoromethyl)malonyl fluoride, boiling at 33° C.

The embodiments of the invention in which an exclusive property or privilege is claimed are defined as follows:

1. A compound of the formula

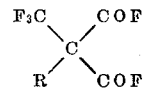

wherein R is F or CF$_3$.

2. A compound according to claim 1,

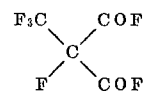

3. A compound according to claim 1,

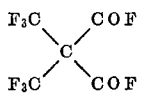

4. The process for making a compound of claim 1 comprising reacting carbonyl fluoride with a perfluoro reactant selected from the group consisting of
perfluoroacrylyl fluoride,
perfluoromethacrylyl fluoride, and
perfluorodimethylketene
in the presence of an alkali metal fluoride catalyst at a temperature of 50° C. to 250° C.

5. The process of claim 4 wherein the perfluoro reactant is perfluoroacrylyl fluoride.

6. The process of claim 4 wherein the perfluoro reactant is perfluoromethacrylyl fluoride.

7. The process of claim 4 wherein the perfluoro reactant is perfluorodimethylketene.

References Cited

England: J. Org. Chem. (1970), 35 (10), pp. 3322–7.

LORRAINE A. WEINBERGER, Primary Examiner

R. D. KELLY, Assistant Examiner

U.S. Cl. X.R.

8—116 R, 119; 252—8.6